United States Patent
Pelamo

(10) Patent No.: US 10,392,171 B2
(45) Date of Patent: Aug. 27, 2019

(54) CAP AND A METHOD FOR MAKING A SOFT DRINK

(71) Applicant: EasySoda Finland Oy, Espoo (FI)

(72) Inventor: Kaj Pelamo, Kirkkonummi (FI)

(73) Assignee: EASYSODA FINLAND OY, Espoo (FI)

(*) Notice: Subject to any disclaimer, the term of this patent is extended or adjusted under 35 U.S.C. 154(b) by 217 days.

(21) Appl. No.: 15/537,459

(22) PCT Filed: Dec. 7, 2015

(86) PCT No.: PCT/FI2015/050856
§ 371 (c)(1),
(2) Date: Jun. 19, 2017

(87) PCT Pub. No.: WO2016/097473
PCT Pub. Date: Jun. 23, 2016

(65) Prior Publication Data
US 2017/0341832 A1    Nov. 30, 2017

(30) Foreign Application Priority Data
Dec. 19, 2014    (FI) ...................................... 20146120

(51) Int. Cl.
*A23L 2/54*    (2006.01)
*B65D 41/04*    (2006.01)
(Continued)

(52) U.S. Cl.
CPC ............ *B65D 51/2835* (2013.01); *A23L 2/54* (2013.01); *A23L 2/56* (2013.01); *B01F 3/04801* (2013.01);
(Continued)

(58) Field of Classification Search
CPC ............ B65D 51/2835; B65D 51/2864; B65D 51/2821; B65D 41/0407; B01F 3/04801; A23L 2/56; A23L 2/54
See application file for complete search history.

(56) References Cited

U.S. PATENT DOCUMENTS

| 5,549,037 A | 8/1996 | Stumphauzer et al. |
| 2007/0045134 A1* | 3/2007 | Dvorak ............. B65D 41/3428 206/222 |

(Continued)

FOREIGN PATENT DOCUMENTS

| CN | 1615247 A | 5/2005 |
| CN | 102361804 A | 2/2012 |

(Continued)

OTHER PUBLICATIONS

First Office Action issued for Chinese Patent Application No. CN201580068878.1, dated Aug. 15, 2018, 10 pages including including 5 pages of English Translation.
(Continued)

*Primary Examiner* — Jason K Niesz
(74) *Attorney, Agent, or Firm* — Ziegler IP Law Group, LLC

(57) ABSTRACT

A cap for making a beverage in a threaded bottle includes an inner cap, an outer cap and a flavor container. The inner cap has external threads and internal threads that match the threads of the mouth of the bottle, and the outer cap has internal threads that match the external threads of the inner cap. The cap includes a first releaser for opening the flavor container into the bottle when the cap is being screwed onto the mouth of the bottle. The cap further includes a carbon dioxide container and a second releaser for opening the carbon dioxide container into the bottle when the outer cap and the inner cap are being screwed relative to each other.
(Continued)

The disclosed embodiments also relate to a method for making a beverage.

10 Claims, 7 Drawing Sheets

(51) Int. Cl.
B65D 51/28 (2006.01)
A23L 2/56 (2006.01)
B01F 3/04 (2006.01)

(52) U.S. Cl.
CPC ..... *B65D 41/0407* (2013.01); *B65D 51/2821* (2013.01); *B65D 51/2864* (2013.01)

(56) References Cited

U.S. PATENT DOCUMENTS

| | | |
|---|---|---|
| 2008/0124432 A1 | 5/2008 | Ma |
| 2008/0245683 A1 | 10/2008 | McKenna et al. |
| 2011/0113972 A1 | 5/2011 | Tatera |
| 2012/0223100 A1 | 9/2012 | Simonian et al. |

FOREIGN PATENT DOCUMENTS

| | | |
|---|---|---|
| JP | 3298747 A | 3/1996 |
| JP | 2006001581 A | 1/2006 |
| KR | 101392957 B1 | 5/2014 |
| WO | 2004005155 A1 | 1/2004 |
| WO | 2010050646 A1 | 5/2010 |
| WO | 2013050185 A1 | 4/2013 |

OTHER PUBLICATIONS

International Preliminary Report on Patentability received for International Patent Application No. PCT/FI2015/050856, Jun. 29, 2017, 08 pages.

International Search Report, Application No. PCT/FI2015/050856, dated Mar. 1, 2016, 3 pages.

Finland Search Report, Application No. 20146120, dated Jun. 22, 2015, 2 pages.

* cited by examiner

CAP AND A METHOD FOR MAKING A SOFT DRINK

FIELD

The aspects of the disclosed embodiments relate to a cap for making a beverage as defined in the preamble of claim 1 and to a method for making a beverage as defined in the preamble of claim 9.

BACKGROUND

It is known to add different kinds of taste flavorants and dyes to water to make beverages. Ready-made beverages can be bought from a shop. In addition, to make beverages at home, devices are known for mixing different kinds of taste flavorants and dyes in water and for adding carbon dioxide to water.

The problem with the known devices for making beverages is their cost. The user must, in addition to the device, separately buy carbon dioxide for carbonating the drink as well as the necessary flavorants. Carbon dioxide and flavorants and dyes are sold in large packages, so the user must make a large amount of beverage with the same taste.

There is thus a need to develop new devices for making beverages, allowing one to easily and economically make a beverage at home in such a way that small amounts of beverage with different tastes can be made at a time.

The aspects of the disclosed embodiments are directed to addressing the defects described above.

Specifically, the aspects of the disclosed embodiments are directed to a new and simple cap for making a beverage, allowing beverages with different tastes to be made at home without the user being forced to buy a large package of a specific flavorant.

The aspects of the disclosed embodiments are also directed to a method for making a beverage.

SUMMARY

The cap and the method according to the disclosed embodiments are characterized by the features presented in the claims.

The cap according to the disclosed embodiments for making a beverage in a threaded bottle comprises an inner cap, an outer cap and a flavor container. The inner cap has external threads, and internal threads that match the threads of the mouth of the bottle, and the outer cap has internal threads that match the external threads of the inner cap. The cap comprises a first releaser for opening the flavor container into the bottle when the cap is being screwed onto the mouth of the bottle. The cap comprises a carbon dioxide container and a second releaser for opening the carbon dioxide container into the bottle when the outer cap and the inner cap are being screwed relative to each other.

In the method according to the disclosed embodiments for making a beverage by means of a cap that is screwable onto a bottle, liquid is added into the bottle and the bottle is closed with the cap which comprises an inner cap, an outer cap and a flavor container, by sealing the mouth of the bottle with the inner cap by screwing the outer cap, at the same time opening the flavor container and releasing the flavors. The cap also comprises a carbon dioxide container. After sealing of the mouth of the bottle with the inner cap, the bottle is turned upside down and carbon dioxide released to the liquid space of the bottle by screwing the outer cap further in the same direction.

The bottle for use to make a beverage may be a normal beverage bottle sold in shops. In one embodiment the bottle is a half-liter beverage bottle. The bottle may as well be of any other volume, the amount of the flavor in the flavor container and of the carbon dioxide in the carbon dioxide container being proportioned to the liquid volume of the bottle. In addition, the concentration of the beverage can be adjusted by means of the liquid volume.

In one embodiment the inner cap and the outer cap are made of plastic. The external threads of the inner cap refer to threads on the outer outer surface of the inner cap. In a corresponding manner, the internal threads of the inner cap or the outer cap refer to threads on the inner surface of the inner cap or the outer cap. The internal threads of the inner cap match the threads of the mouth of the bottle, so that the inner cap is screwable onto the mouth of the bottle. The external threads of the inner cap and the internal threads of the outer cap match each other, so that the outer cap is screwable onto the inner cap.

In one embodiment the flavor container is made of plastic. The flavor container may be an integral part of the inner or the outer cap or a separate part. In one embodiment the flavor container is a bag. The flavor container may, in addition to flavor, also contain other substances, such as dyes or additives. The flavor container holds a dose of flavorants, dyes and/or additives in an amount proportioned to the liquid volume of the bottle being used. In a ready assembled cap the flavor container is closed. The flavor container opens when the cap is being screwed onto the mouth of the bottle, and the flavor flows into the bottle.

The carbon dioxide container contains carbon dioxide. In one embodiment the carbon dioxide container is made of metal.

The purpose of the first releaser is to open the flavor container when the cap is being screwed onto the mouth of the bottle to release the flavor into the bottle. In one embodiment the first releaser also closes the flavor container before the cap is screwed onto the mouth of the bottle. In one embodiment the first releaser is a sealing ring which closes openings provided at the base of the flavor container when the cap has not been screwed onto the mouth of the bottle and opens the flavor openings at the base of the flavor container when the cap is screwed onto the mouth of the bottle in a sealing manner.

The purpose of the second releaser is to open the carbon dioxide container when the inner cap and the outer cap are being screwed relative to each other so that carbon dioxide is released into the bottle. In one embodiment the second releaser is an integral part of the inner cap. In one embodiment the second releaser is a separate component and not part of the inner cap.

In one embodiment the cap comprises a screw locking mechanism to prevent the inner cap and the outer cap from screwing relative to each other when the inner cap is being screwed onto the mouth of the bottle.

In one embodiment the screw locking mechanism is arranged to prevent the inner cap and the outer cap that have been screwed to each other from unscrewing when they are together being screwed off the mouth of the bottle. When carbon dioxide has been released into the bottle, the screw locking mechanism locks the inner and the outer cap to each other so that the inner cap and the outer cap do not screw relative to each other, and thus allows the removal of the whole cap from the mouth of the bottle in one piece.

In one embodiment the screw locking mechanism is embodied as matching projections and edged members on the outer surface of the inner cap and on the inner surface of the outer cap. In one embodiment the projections and edged members are disposed at the external threads of the inner cap and at the internal threads of the outer cap. In one embodiment the projections are shaped to be beveled. In one embodiment the edged members are shaped to be sharp. The projections and edged members are flexible and configured in shape and size to be slidable past each other. The stiffness, shape and size of the projections and edged members are configured to prevent screwing of the inner and the outer cap relative to each other before the mouth of the bottle has been sealed by the inner cap. The shape of the projections and edged members allows the screwing of the inner and the outer cap relative to each other in one direction while preventing the screwing of the inner and the outer cap relative to each other in the opposite direction. In one embodiment the edged members are grouped in pairs on the outer surface of the inner cap or on the inner surface of the outer cap so that the projections on the mating surface lock between a pair of edged members.

In one embodiment the screw locking mechanism is configured by designing the tightness of the external threads of the inner cap and the internal threads of the outer cap to be such that the inner cap first screws around the mouth of the bottle and only after that does the outer cap screw relative to the inner cap. In one embodiment the tightness between the threads of the bottle and the internal threads of the inner cap is less than the tightness between the external threads of the inner cap and the internal threads of the outer cap, so that the mouth of the bottle becomes sealed by the inner cap before the outer cap and the inner cap screw relative to each other.

In one embodiment the second releaser comprises a piercing member which is arranged to penetrate into the carbon dioxide container for opening the container when the outer cap and the inner cap are being screwed relative to each other, the piercing member having an opening which extends through the inner cap to convey carbon dioxide into the bottle. The length and position of the piercing member are designed to allow the piercing member to extend far enough to open the carbon dioxide capsule when the inner and the outer cap are being screwed relative to each other.

In one embodiment the piercing member is made of metal. In one embodiment the piercing member is made of plastic. The piercing member may be a needle. In one embodiment the piercing member is hollow and carbon dioxide is conveyed into the bottle through the opening of the piercing member and through an opening of the inner cap which is connected thereto. In one embodiment the diameter of the opening of the inner cap is 0.3-0.7 mm. In one embodiment the diameter of the opening of the inner cap is 0.4-0.6 mm. In one embodiment the diameter of the opening of the inner cap is 0.5 mm. By means of the diameter of the opening of the inner cap, it is possible to adjust the speed at which carbon dioxide is discharged from the carbon dioxide container, and thus the carbonation of the drink. When the diameter of the opening of the inner cap is 0.5 mm, the liquid in the bottle becomes well carbonated. In one embodiment the diameter of the opening of the piercing member is larger than the diameter of the opening of the inner cap.

In one embodiment the head of the piercing member is shaped as a truncated cone. In one embodiment the piercing member is shaped as a truncated cone. The head of the piercing member is beveled sharp in order to pierce the carbon dioxide container when the inner and the outer cap are being screwed relative to each other. In one embodiment the surface of the truncated cone shaped head of the piercing member is angled at 15-25 degrees to the central axis of the piercing member. In one embodiment the surface of the truncated cone shaped head of the piercing member is angled at 20 degrees to the central axis of the piercing member. In one embodiment the head of the piercing member is cut sharp with a beveled cut.

In one embodiment the cap comprises an indicator which is arranged to indicate screwing of the inner cap onto the mouth of the bottle in a sealing way. The indicator gives a signal which may be based for example on the visual perception, tactile perception or auditory perception. The user of the cap knows due to the signal that the inner cap is screwed in a sufficiently sealing way onto the mouth of the bottle so that the bottle can be turned upside down to release carbon dioxide. The bottle must be turned upside down before releasing carbon dioxide in order that the liquid in the bottle becomes carbonated. When carbon dioxide is released into the liquid space of the bottle while the bottle is upside down, the liquid in the bottle becomes carbonated effectively. Carbon dioxide dissolves in the liquid in the bottle and as a result, when carbon dioxide and water react, carbonic acid is formed.

In one embodiment, sealing of the mouth of the bottle with the inner cap is noted due to a signal produced by the cap, and after that the bottle is turned upside down.

The embodiments of the present disclosure described above may be freely combined with each other. Several embodiments may be combined to form a new embodiment. The cap or the method that is the object of the present disclosure may comprise one or more of the above-described embodiments of the present disclosure.

The cap and the method for making a beverage according to the disclosed embodiments provide considerable advantages over the prior art. Making a beverage by means of the cap according to the disclosed embodiments is very simple. To make a beverage by means of the cap and the method according to the disclosed embodiments only requires the cap, tap water and a normal beverage bottle available from a shop. In other words, the user does not have to carry home large amounts of ready-made soft drinks. Furthermore, the user is not forced to buy large amounts of carbon dioxide or taste flavorants and dyes to make a beverage. The user of the cap is not restricted to the bottles of a specific manufacturer. In addition, the cap according to the disclosed embodiments is inexpensive. It is possible for the user to buy and make just one bottle of a beverage with a specific taste at a time.

LIST OF FIGURES

The aspects of the disclosed embodiments will be described below with reference to the accompanying figures which illustrate the embodiments by way of example. The present disclosure is not limited to the embodiments of the figures.

Figure 3:
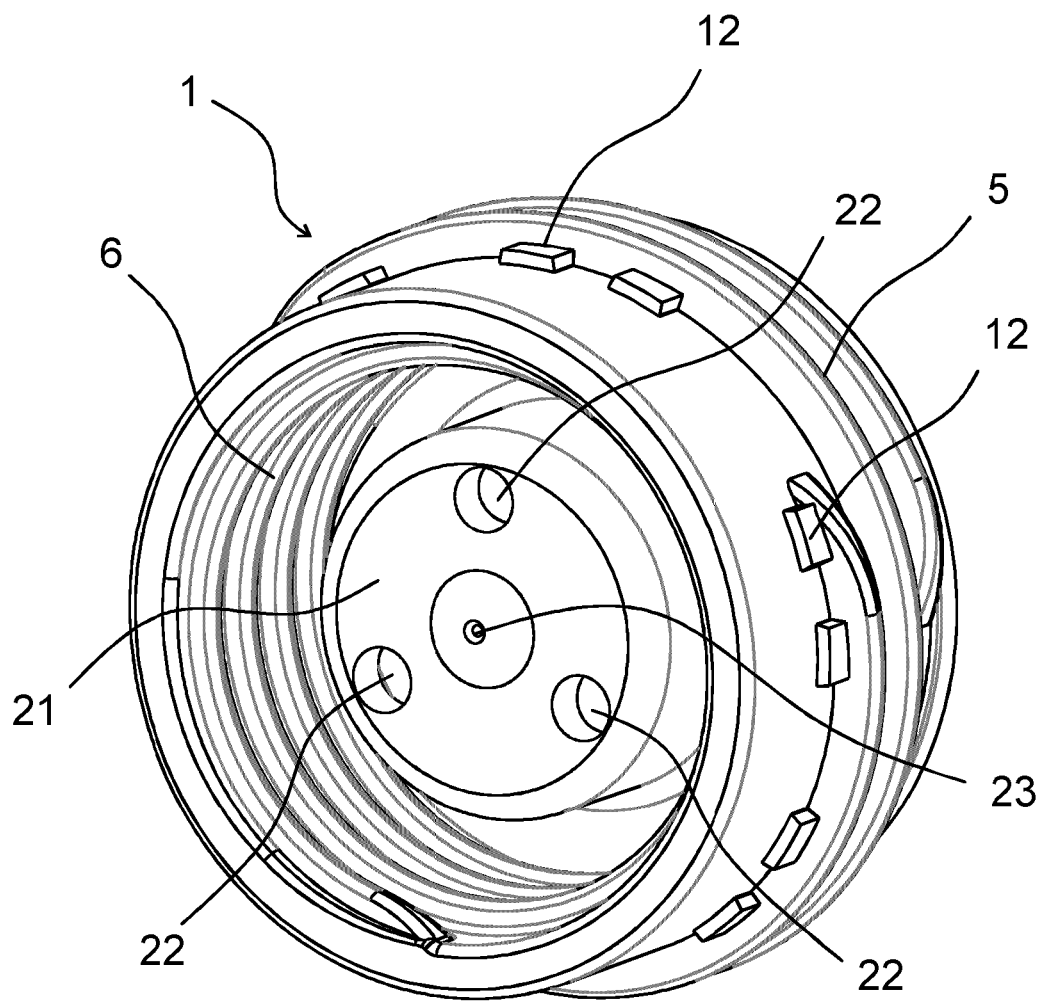
Figure 4:
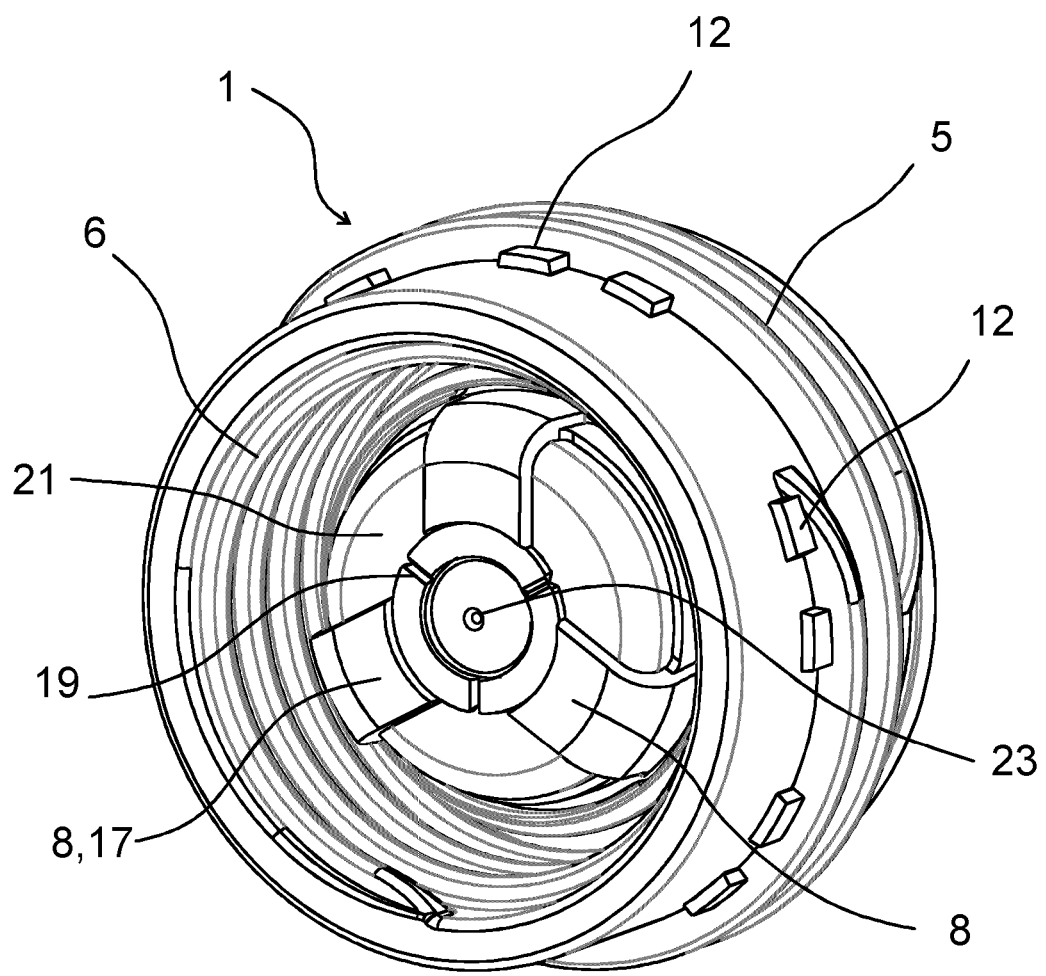
Figure 5:
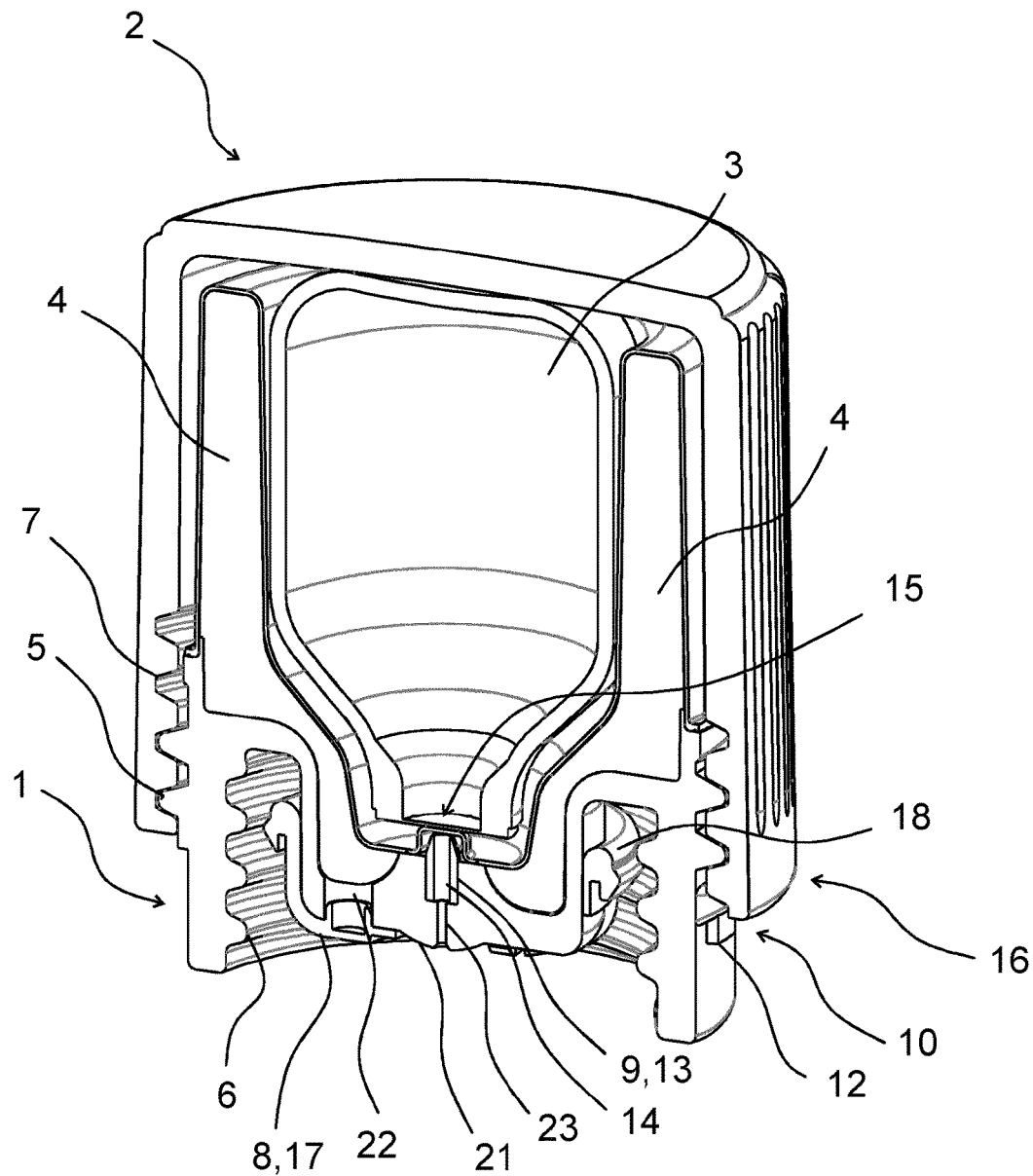
Figure 6:
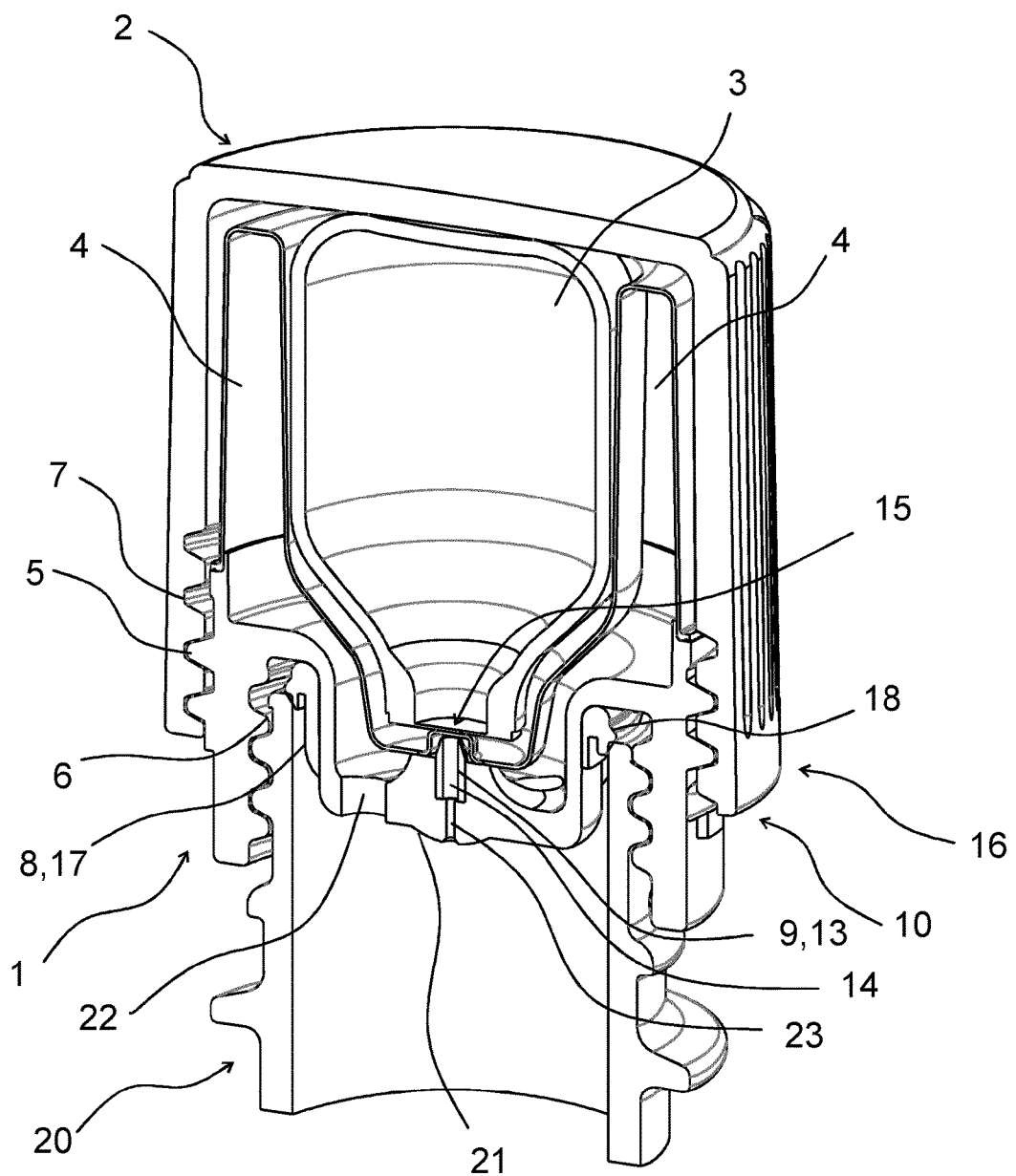
Figure 7:
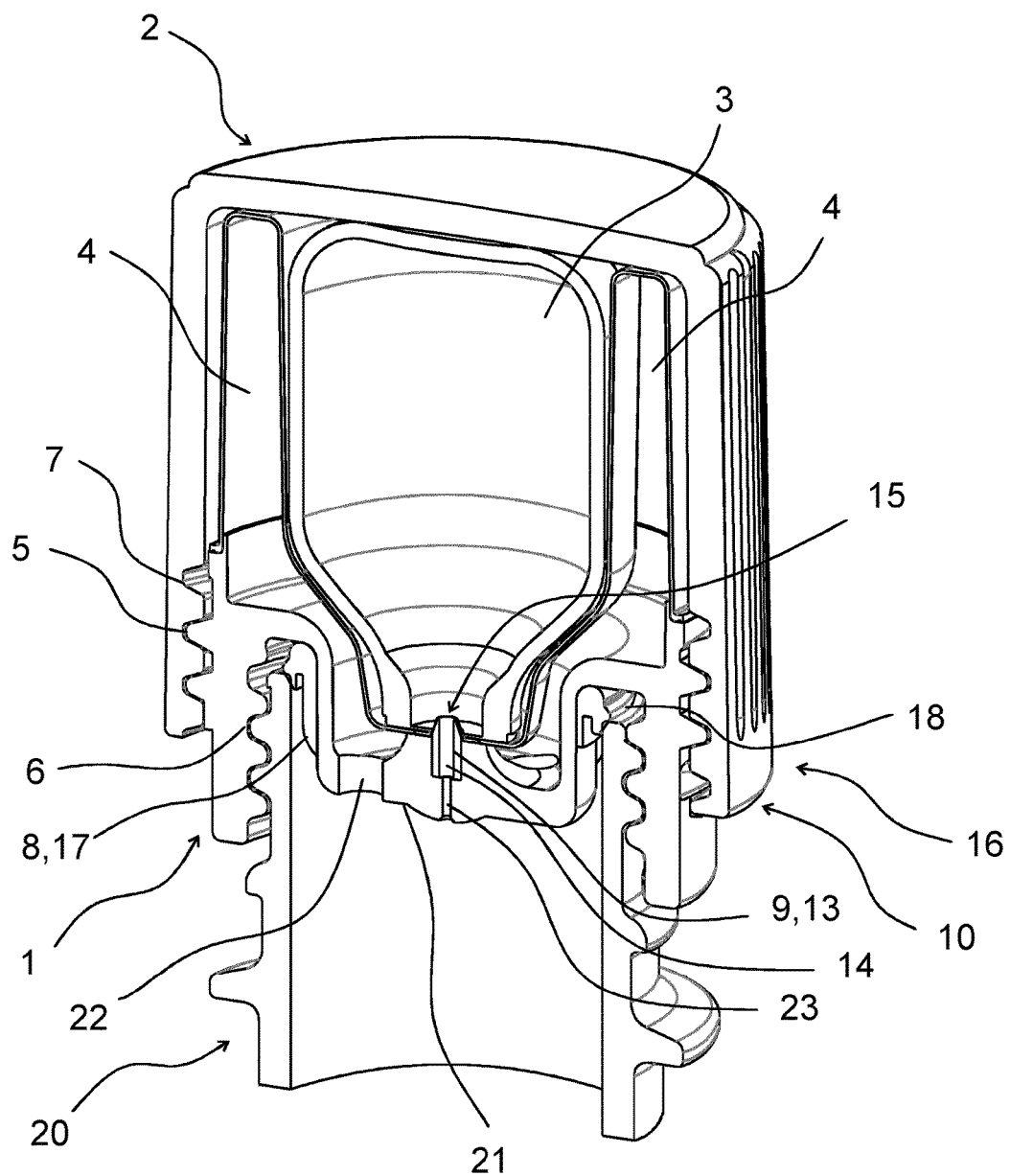

FIG. 3 illustrates an inner cap according to one embodiment as seen from the base, FIG. 4 illustrates an inner cap and a sealing ring according to one embodiment as seen from the base, FIG. 5 illustrates a cap according to one embodiment before screwing of the cap onto the mouth of a bottle, FIG. 6 illustrates a cap according to one embodiment screwed onto the mouth of a bottle in a position where the flavor container has opened, and FIG. 7 illustrates a cap according to one embodiment screwed onto the mouth of a bottle in a position where the carbon dioxide container has opened.

DETAILED DESCRIPTION

Figure 1:
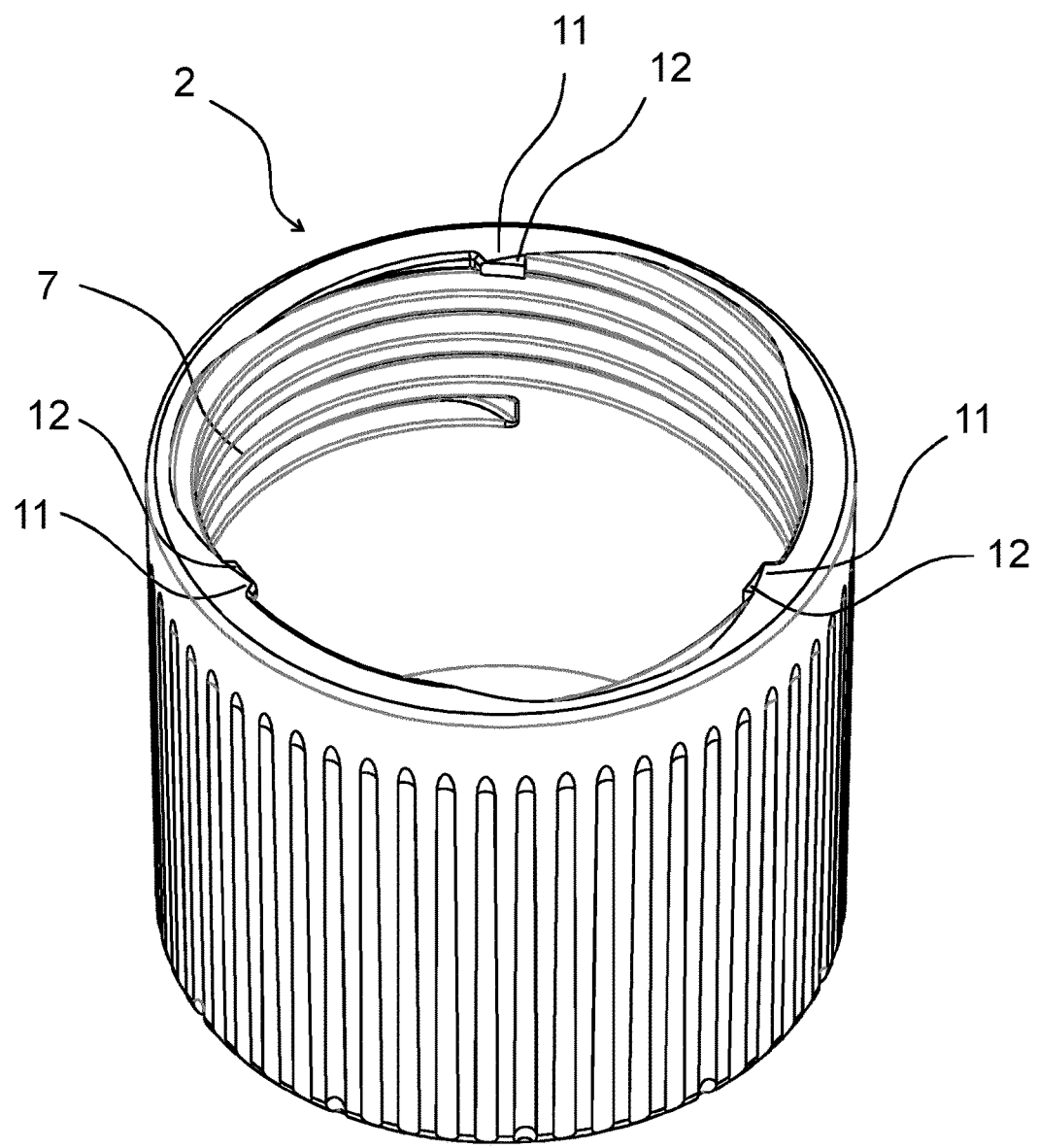
FIG. 1 illustrates an outer cap according to one embodiment.

FIG. 1 illustrates an outer cap 2 according to one embodiment. The inner surface of the outer cap 2 is provided with internal threads 7 that match the external threads 5 of an inner cap 1. In addition, projections 11 and edged members 12 are provided on the inner surface of the outer cap 2, and together with edged members 12 of the inner cap 1 they form part of a screw locking mechanism 10. A three-start thread is provided in the outer cap 2 according to FIG. 1, but there may as well be some other number of threads. The number of projections 11 and edged members 12 in the outer cap 2 according to FIG. 1 is three, but there may as well be some other number of projections 11 and edged members 12.

Figure 2:
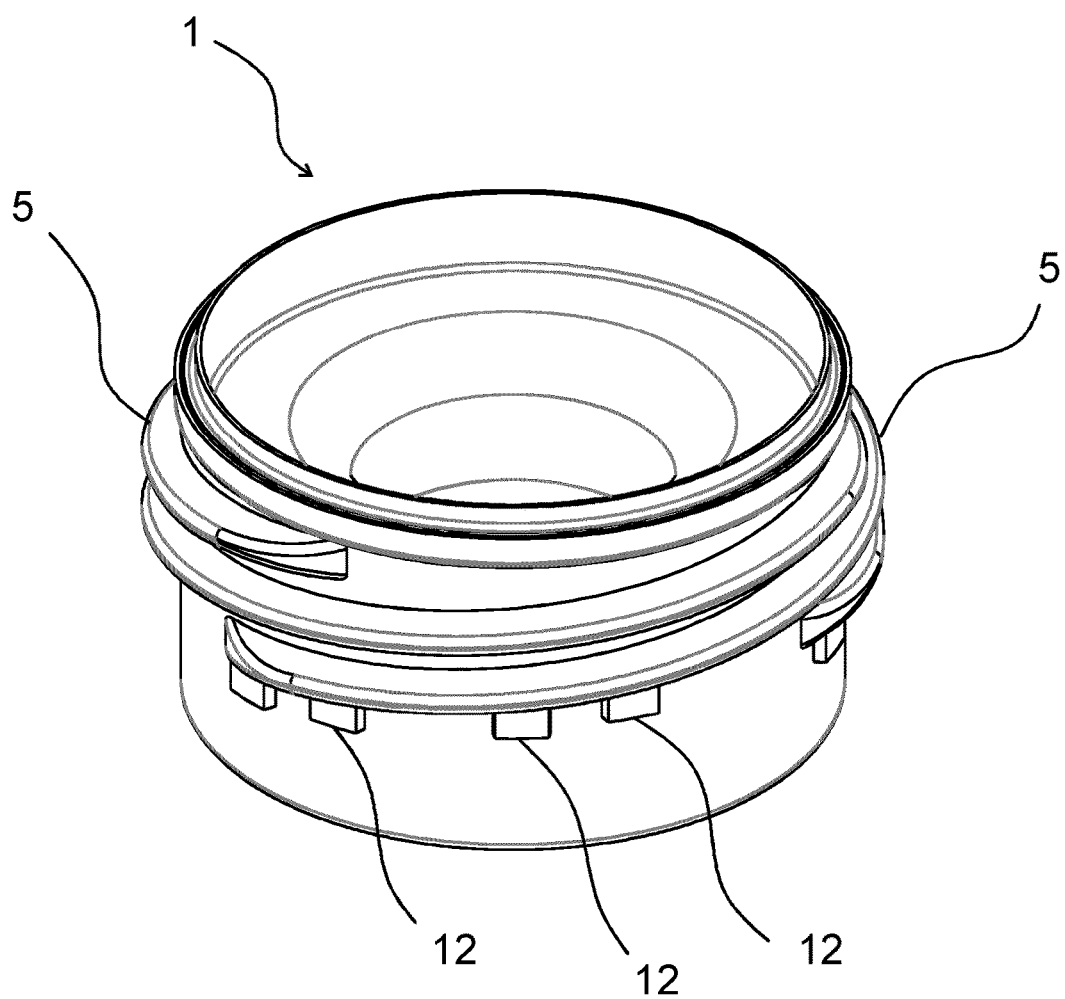
FIG. 2 illustrates an inner cap according to one embodiment.

FIG. 2 illustrates an inner cap 1 according to one embodiment. The outer surface of the inner cap 1 is provided with external threads 5 that match the internal threads 7 of the outer cap 2. The outer surface of the inner cap 1 is also provided with edged members 12 which are grouped in pairs in the inner cap 1 according to FIG. 2 so that the projections 11 and edged members 12 on the inner surface of the outer cap 2 lock between a pair formed by the edged members 12 of the inner cap 1. In a ready assembled cap the projections 11 and edged members 12 of the outer cap 2 are provided between a first pair of edged members of the inner cap 1 so as to allow screwing of the inner cap and the outer cap relative to each other only in one direction but not in the opposite direction. The inner cap 1 according to FIG. 2 has three groups formed by two pairs of edged members 12, i.e. the total number of edged members is twelve. However, there may as well be some other number of edged members.

FIGS. 3 and 4 illustrate an inner cap 1 according to one embodiment as seen from the base 21. External threads 5 that match the internal threads 7 of the outer cap 2 are provided on the outer surface of the inner cap 1. The outer surface of the inner cap 1 is also provided with edged members 12 which together with the projections 11 and edged members 12 of the outer cap 2 form a screw locking mechanism 10. Internal threads 6 that match the threads of the mouth of the bottle 20 are provided on the inner surface of the inner cap 1. In addition, an opening 23 is provided at the base 21 of the inner cap 1 in direct alignment with an opening 14 of a piercing member 13 for releasing carbon dioxide into the bottle 20 from a carbon dioxide container 3. The piercing member 13 and its specific position are illustrated in FIGS. 5, 6 and 7.

In FIG. 3 the base 21 of the inner cap 1 has flavor openings 22 for releasing flavor from a flavor container 4 into the bottle 20. In FIG. 4 the flavor openings 22 are covered with a first releaser 8 which seals the flavor openings 22. The purpose of the first releaser 8 is to release flavors by opening the flavor container 4 when the cap is being screwed onto the mouth of the bottle 20. In the inner cap 1 according to FIG. 4 the first releaser 8 is a sealing ring 17 which closes all three flavor openings 22 of the base 21. FIG. 4 illustrates, in the sealing ring 17, sections 19 which are thinner than the rest of the sealing ring 17 and at which the sealing ring 17 tears when the cap is being screwed onto the mouth of the bottle. The operation of the sealing ring 17 as the first releaser 8 will be described with reference to FIG. 6.

FIGS. 5, 6 and 7 illustrate a cap according to one embodiment. The cap is illustrated in FIG. 5 before screwing of the cap onto the mouth of the bottle. The cap is illustrated in FIG. 6 screwed onto the mouth of the bottle 20 so that the mouth of the bottle 20 is sealed by the inner cap 1 and the flavor container 4 has opened. The cap is illustrated in FIG. 7 screwed onto the mouth of the bottle 20 so that the outer cap 2 and the inner cap 1 have been screwed relative to each other and the carbon dioxide container 3 has opened.

The cap of FIGS. 5, 6 and 7 comprises an inner cap 1, an outer cap 2, a carbon dioxide container 3 and a flavor container 4. The inner cap 1 forms part of the wall of the flavor container 4. Flavor is released into the bottle from the flavor container 4 through flavor openings 22 of the base 21 of the inner cap when the cap is being screwed onto the mouth of the bottle. External threads 5, as well as internal threads 6 that match the threads of the mouth of the bottle, are provided in the inner cap. Internal threads 7 that match the external threads 5 of the inner cap 1 are provided in the outer cap 2. The cap comprises a first releaser 8 which is a sealing ring 17 in the embodiment according to FIGS. 5, 6 and 7.

In addition, the cap comprises a second releaser 9 which in the embodiment according to FIGS. 5, 6 and 7 is a piercing member 13 with a central opening 14. The opening 14 of the piercing member 13 extends through an opening 23 in the inner cap 1 into the bottle 20. The head 15 of the piercing member 13 is sharply beveled and shaped as a truncated cone. The piercing member 13 is embedded in the inner cap 1 and its orientation and length are configured to be such that the piercing member 13 pierces the carbon dioxide container 3 when the inner cap 1 and the outer cap 2 are being screwed relative to each other so as to release carbon dioxide into the bottle 20.

A screw locking mechanism 10 illustrated in FIGS. 5, 6 and 7 prevents the outer cap 2 and the inner cap 1 from screwing relative to each other during screwing of the inner cap 1 onto the mouth of the bottle 20. The screw locking mechanism 10 also prevents unscrewing of the inner cap 1 and the outer cap 2 that have been screwed on each other during screwing of the cap off the mouth of the bottle 20, allowing this way the whole cap to be screwed as one piece off the mouth of the bottle 20. The screw locking mechanism 10 is embodied as matching projections 11 and edged members 12 on the outer surface of the inner cap 1 and on the inner surface of the outer cap 2. The projections 11 and edged members 12 on the outer surface of the inner cap 1 and on the inner surface of the outer cap 2 are better illustrated in FIG. 1-4. In addition, the tightness between the internal threads 7 of the outer cap 2 and the matching external threads 5 of the inner cap 1 may form part of the screw locking mechanism 10.

FIGS. 5, 6 and 7 also illustrate an indicator 16 which is arranged to indicate screwing of the inner cap 1 onto the mouth of the bottle 20 in a sealing way. The projections 11 and edged members 12 of the locking mechanism 10 function as the indicator 16 in the cap according to FIGS. 5, 6 and 7. The projections 11 and edged members 12 on the outer surface of the inner cap 1 and on the inner surface of the outer cap 2 are better illustrated in FIG. 1-4. The projections 11 and edged members 12 indicate screwing of the inner cap 1 in a sealing way onto the mouth of the bottle 20 by sliding past each other and making a clicking sound at the same time. However, the indicator 16 may as well be of another type apart from that illustrated in the cap according to FIGS. 5, 6 and 7. The indicator 16 may be for example acoustic, optical or based on the tactile perception. The indicator 16 does not have to be part of the locking system 10.

The cap illustrated in FIG. 5 has not yet been screwed onto the mouth of the bottle, so the flavor container 4 as well as the carbon dioxide container 3 are closed. The flavor openings 22 of the base 21 of the inner cap 1 are closed by the first releaser 8. The cap is supplied to the user in this configuration.

FIG. 6 illustrates the cap screwed onto the mouth of the bottle 20 so that the mouth of the bottle 20 is sealed by the inner cap 1 and the flavor container 4 has opened. When the cap is being screwed onto the mouth of the bottle, the sealing ring 17 tears and the flavor openings 22 of the base 21 of the inner cap 1 open, opening the flavor container 4 at the same time, so that flavors contained in the flavor container 4 are released into the bottle 20. Tearing of the sealing ring 17 is caused by a flange 18 which is thicker than the rest of the sealing ring 17 as illustrated in FIG. 6 and becomes attached above the mouth opening of the bottle 20 when the cap is being screwed onto the mouth of the bottle 20. In addition, the flange 18 of the sealing ring 17 ensures that the inner cap 1 is screwed onto the mouth of the bottle 20 in a sealing way to allow turning of the bottle 20 upside down for releasing carbon dioxide. Sealing of the mouth of the bottle 20 by the inner cap 1 is noted due to a click made by the indicator 16.

FIG. 7 illustrates the cap screwed onto the mouth of the bottle 20 so that the outer cap 2 and the inner cap 1 have been screwed relative to each other and the carbon dioxide container 3 has opened. In the cap according to FIG. 7 the inner cap 1 has screwed in a sealing way onto the mouth of the bottle 20, and furthermore the outer cap 2 and the inner cap 1 have screwed relative to each other to the extent that the piercing member 13 has pierced the carbon dioxide container 3. Carbon dioxide is released into the bottle 20 from the carbon dioxide container 3 through the opening 14 of the piercing member 13 and the opening 23 of the inner cap 1.

The present disclosure is not limited to the above-described examples of its embodiments; instead, many modifications are possible within the scope of the inventive idea defined by the claims.

The invention claimed is:

1. A cap for making a beverage in a threaded bottle, the cap comprising an inner cap (1), an outer cap (2) and a flavor container (4), the inner cap (1) having external threads (5), and internal threads (6) that match the threads of the mouth of the bottle and the outer cap (2) having internal threads (7) that match the external threads (5) of the inner cap (1), the cap comprising a first releaser (8) for opening the flavor container (4) into the bottle when the cap is being screwed onto the mouth of the bottle, wherein
the cap comprises a carbon dioxide container (3) and a second releaser (9) for opening the carbon dioxide container (3) into the bottle when the outer cap (2) and the inner cap (1) are being screwed relative to each other.

2. The cap according to claim 1, wherein the cap comprises a screw locking mechanism (10) to prevent the inner cap (1) and the outer cap (2) from screwing relative to each other when the inner cap (1) is being screwed onto the mouth of the bottle.

3. The cap according to claim 2, wherein the screw locking mechanism (10) is arranged to prevent the inner cap (1) and the outer cap (2) that have been screwed to each other from unscrewing when they are together being screwed off the mouth of the bottle.

4. The cap according to claim 2, wherein that the screw locking mechanism (10) is embodied as matching projections (11) and edged members (12) on the outer surface of the inner cap (1) and on the inner surface of the outer cap (2).

5. The cap according to claim 2, wherein the screw locking mechanism (10) is configured by designing the tight-ness of the external threads (5) of the inner cap (1) and the internal threads (7) of the outer cap (2) to be such that the inner cap (1) first screws around the mouth of the bottle and only after that does the outer cap (2) screw relative to the inner cap (1).

6. The cap according to claim 1, wherein the second releaser (9) comprises a piercing member (13) arranged to penetrate into the carbon dioxide container (3) for opening the container (3) when the outer cap (2) and the inner cap (1) are being screwed relative to each other, the piercing member (13) having an opening (14) which extends through the inner cap (1) to convey carbon dioxide into the bottle.

7. The cap according to claim 6, wherein the head (15) of the piercing member (13) is shaped as a truncated cone.

8. The cap according to claim 1, wherein the cap comprises an indicator (16) which is arranged to indicate screwing of the inner cap (1) onto the mouth of the bottle in a sealing way.

9. A method for making a beverage by means of a cap that is screwable onto a bottle, wherein liquid is added into the bottle and the bottle is closed with the cap which comprises an inner cap (1), an outer cap (2) and a flavor container (4), by sealing the mouth of the bottle with the inner cap (1) by screwing the outer cap (2), at the same time opening the flavor container (4) and releasing the flavors, wherein the cap comprises a carbon dioxide container (3) and after sealing of the mouth of the bottle with the inner cap (1) the bottle is turned upside down and carbon dioxide released to the liquid space of the bottle by screwing the outer cap (2) further in the same direction.

10. The method for making a beverage according to claim 9, wherein that sealing of the mouth of the bottle with the inner cap (1) is noted due to a signal produced by the cap, and after that the bottle is turned upside down.

* * * * *